(12) United States Patent
Friedrich et al.

(10) Patent No.: US 12,257,630 B2
(45) Date of Patent: Mar. 25, 2025

(54) PRINT HEAD FOR 3D PRINTING OF METALS, DEVICE FOR ADDITIVELY MANUFACTURING THREE-DIMENSIONAL WORKPIECES, COMPRISING A PRINT HEAD AND METHOD FOR OPERATING A DEVICE

(71) Applicant: Robert Bosch GmbH, Stuttgart (DE)

(72) Inventors: Viktor Friedrich, Sersheim (DE); Benjamin Schweizer, Horb (DE); Eberhard Maier, Koengen (DE)

(73) Assignee: Robert Bosch GmbH, Stuttgart (DE)

( * ) Notice: Subject to any disclaimer, the term of this patent is extended or adjusted under 35 U.S.C. 154(b) by 955 days.

(21) Appl. No.: 17/413,708

(22) PCT Filed: Dec. 6, 2019

(86) PCT No.: PCT/EP2019/083980
§ 371 (c)(1),
(2) Date: Oct. 20, 2021

(87) PCT Pub. No.: WO2020/120317
PCT Pub. Date: Jun. 18, 2020

(65) Prior Publication Data
US 2022/0023938 A1    Jan. 27, 2022

(30) Foreign Application Priority Data

Dec. 14, 2018   (DE) .................. 10 2018 221 758.0

(51) Int. Cl.
*B22D 23/00* (2006.01)
*B22F 3/115* (2006.01)
(Continued)

(52) U.S. Cl.
CPC ............ *B22F 3/115* (2013.01); *B22D 23/003* (2013.01); *B22F 12/53* (2021.01); *B22F 12/70* (2021.01); *B33Y 30/00* (2014.12)

(58) Field of Classification Search
CPC .......... B22F 3/115; B22F 12/53; B22F 12/70; B22F 2009/0888; B22F 2999/00; B22D 23/003; B33Y 30/00; B33Y 10/00
(Continued)

(56) References Cited

U.S. PATENT DOCUMENTS 5,598,200 A * 1/1997 Gore .................. B22F 9/08
347/88
6,450,416 B1 * 9/2002 Berg .................. B05C 5/0225
239/102.1
(Continued)

FOREIGN PATENT DOCUMENTS

CN      1780706 A       5/2006
CN    201128758        10/2008
(Continued)

OTHER PUBLICATIONS

Translation of International Search Report for Application No. PCT/EP2019/083980 dated Feb. 5, 2020 (3 pages).
(Continued)

*Primary Examiner* — Jessee R Roe
*Assistant Examiner* — Michael Aboagye
(74) *Attorney, Agent, or Firm* — Michael Best & Friedrich LLP

(57) ABSTRACT

The invention relates to a print head (1) for additively manufacturing three-dimensional workpieces, comprising a housing (3), a device (28) for feeding a metal (14), a piston (5), a reservoir (7) with an outlet opening (10) and an actuator device (12) for displacing the piston (5), wherein the reservoir (7, 27) has a melt region (20) and a displace-
(Continued)

ment body chamber (21) for a liquid phase (8) of the metal (14), wherein the melt region (20) adjoins the inert atmosphere (22) and is connected to the displacement body chamber (21) such that, as a result of the displacement of the piston (5), the liquid phase (8) of the metal (14) can be stimulated to pass through the outlet opening (10), said outlet opening (10) being mounted on an insert (11) of the print head (1). The invention is characterised in that the print head (1) comprises a device (50) for feeding a protective gas (60) to the outlet opening (10) of the print head (1). The invention also relates to a device (100) for additively manufacturing three-dimensional workpieces and to a method for operating a print head (1).

9 Claims, 3 Drawing Sheets

(51) Int. Cl.
*B22F 12/53* (2021.01)
*B22F 12/70* (2021.01)
*B33Y 30/00* (2015.01)

(58) Field of Classification Search
USPC .............. 222/596, 590, 591, 593; 266/236; 700/118, 119
See application file for complete search history.

(56) References Cited

U.S. PATENT DOCUMENTS

| 9,307,625 | B2* | 4/2016 | Rollinger | H05G 2/006 |
| 11,890,680 | B2* | 2/2024 | Schaeuffele | B22F 3/115 |
| 11,931,753 | B2* | 3/2024 | Schweizer | B05B 1/323 |
| 2017/0274454 | A1 | 9/2017 | Feng | |
| 2018/0311727 | A1 | 11/2018 | Willmann | |
| 2019/0328029 | A1* | 10/2019 | Molnar | B33Y 40/00 |

FOREIGN PATENT DOCUMENTS

| CN | 203764977 U | 8/2014 |
| CN | 105238941 | 1/2016 |
| CN | 105772942 A | 7/2016 |
| CN | 107876768 A | 4/2018 |
| CN | 108127118 A | 6/2018 |
| DE | 102017208420 A1 | 11/2018 |
| EP | 3335580 A1 | 6/2018 |

OTHER PUBLICATIONS

Zuo et al., "Effect of wetting behavior on generation of uniform aluminum droplets obtained by pneumatic drop-on-demand technique", Journal of Materials Processing Technology, vol. 214, Issue 11, 2014, pp. 2566-2575.

* cited by examiner

PRINT HEAD FOR 3D PRINTING OF METALS, DEVICE FOR ADDITIVELY MANUFACTURING THREE-DIMENSIONAL WORKPIECES, COMPRISING A PRINT HEAD AND METHOD FOR OPERATING A DEVICE

BACKGROUND OF THE INVENTION

The invention relates to a print head for a 3D printer which is suitable for the printing of metals, to a device for additively manufacturing three-dimensional workpieces, comprising a print head, and to a method for operating a device.

A 3D printer for a thermoplastic material receives a solid phase of this material as the raw material, produces a liquid phase therefrom, and applies this liquid phase selectively at the locations which belong to the object to be created. Such a 3D printer comprises a print head in which the raw material is melted. Also provided are means for generating a relative movement between the print head and the working surface on which it is intended for the object to be formed. Either just the print head, just the working surface, or both the print head and the working surface can thus be moved.

The print head has a first operating state in which liquid material is discharged from it, and a second operating state in which no liquid material is discharged from it. The second operating state is assumed, for example, when it is intended to move to a different position on the working surface and that no material is deposited en route. It is possible to switch, for example, between the two operating states of the print head by switching the advance of the solid raw material on and off.

Compared with thermoplastics, metals have a significantly higher melting point and at the same time a significantly lower viscosity in the liquid state.

One research approach for solving the object of adding liquid metal to the object only at defined locations is the pneumatic drop-on-demand technique. This technique is explained, for example, in Han-song Zuo, He-jun Li, Le-jua Qi, Jun Luo, Song-yi Zhong, Hai-peng Li (2014), Effect on wetting behavior on generation of uniform aluminum droplets obtained by pneumatic drop-on-demand technique, *Journal of Materials Processing Technology*, 214, 2566-2575. The metal raw material is melted by an induction heater in a reservoir which has an open nozzle at its lower end. In order to force a drop of liquid metal from this nozzle, a pressure pulse generated by a magnetic valve is applied to the reservoir by delivery of an inert gas. A disadvantage of this solution is the formation of drops by a pressure pulse on the gas because the compressibility of the gas constrains the possibility of a high activation frequency and consequently the build-up rate of a workpiece is not acceptable for industrial use.

In most known applications, an inert atmosphere is generated in a closed chamber of the printer. The chamber is here filled with inert gas via inlets with the aid of elevated pressure. The chamber is here usually sealed in such a way that there is a small passage as a leakage point to the surrounding atmosphere. By virtue of the permanently present elevated pressure during the printing process, a volume exchange with the surroundings occurs inside the chamber.

In order to be able to build 3D structures with a high degree of repeatability, the surroundings of the drop outside the print head must be made inert. This needs to be the case both when discharged from the print head and when traveling to the substrate. If there is no inert atmosphere around the ejected drop, oxide formation usually occurs at the nozzle outlet and oxide inclusions occur in the 3D workpiece to be formed. For this purpose, the chamber must be sealed with respect to the surrounding atmosphere (air). The size of the chamber needs be defined depending on the size of the workpiece to be printed and it needs to be filled with inert gas. A disadvantage is the high consumption of high-quality inert gas in order to achieve the desired print quality.

SUMMARY OF THE INVENTION

The object of the invention is to provide a print head which reduces the consumption of the inert gas whilst maintaining print quality.

The object is achieved by the print head according to the invention, the device according to the invention, and the method according to the invention for operating the print head.

The print head according to the invention for additively manufacturing three-dimensional workpieces comprises a housing, a device for delivering a metal, a piston, a reservoir with a discharge opening, and an actuator device for displacing the piston, wherein the reservoir has a melting region and compression space for a liquid phase of the metal, wherein the melting region is adjacent to an inert atmosphere and is connected to the compression space in such a way that the liquid phase of the metal can be induced to pass through the discharge opening by means of the displacement of the piston, wherein the discharge opening is arranged on an insert of the print head. According to the invention, the print head has a device for delivering a protective gas to the discharge opening of the print head. The protective gas advantageously has the properties of an inert gas, or is an inert gas.

As a result, the consumption of the inert gas during the printing process can advantageously be reduced. Efficient use of the inert gas is possible owing to the embodiment according to the invention because the inert atmosphere is generated directly at the drop formation. It is consequently also possible to fill the remainder of the chamber with a gas with a lower protective gas quality, as a result of which costs can be saved.

An acceptable chamber is required for industrial applications. For this purpose, the chamber is moved in three dimensions, for example by linear drives. These interfaces form a potential leak. By means of the delivery according to the invention of protective gas close to the nozzle, advantageously only that region is made inert which is required immediately for the printing process. Inert gas here flows around the falling drop and the formation of oxidation is consequently advantageously avoided. If the delivery of protective gas close to the nozzle is performed in a closed chamber, the print head can advantageously be operated with a lower quality of inert gas. In addition, the quantities of the inert gas can be regulated by the print head according to the invention as a function of the printing process, as result of which protective gas or inert gas can be saved.

In a development of the invention, the insert has at least a nozzle plate with the discharge opening, a guide sleeve for guiding the piston, and a nozzle clamping nut for fastening the nozzle plate to the guide sleeve, and the device for delivering the protective gas is arranged on the nozzle clamping nut.

In a preferred development, the device for delivering a protective gas forms, with the nozzle clamping nut, a gap for delivering the protective gas to the discharge opening.

In a development, a choke is formed inside the gap.

In a development, the device for delivering a protective gas has a duct for delivering the protective gas to the gap.

In a development, the duct has a partial duct which opens into an annular groove of the device for delivering a protective gas.

In a preferred development, the device for delivering a protective gas has a plane surface which, with the nozzle clamping nut, forms the gap and on which a peripheral protrusion is formed which, with the nozzle clamping nut, forms the choke.

The duct forms a tangentially arranged connection to the annular groove and the protective gas is consequently conveyed from, for example, a gas cylinder to the discharge opening or the nozzle. The tangential introduction of the protective gas has the advantage that the gas is distributed homogeneously in the protective gas delivery system before it flows over a protrusion or choke toward the nozzle bore. The quantity of gas is modified externally via a valve or an adjustable choke. This can also be effected automatically using a corresponding sensor system and by activating the actuator system. An inert gas atmosphere with a relatively high-quality protective gas is thus created around the nozzle bore. The throttle location can be optimized according to the required quantity of gas and an optimal flow can consequently then be set.

In a further embodiment of the invention, the nozzle clamping nut with integrated protective gas delivery system can be formed from one part, i.e. as a single piece. To achieve this, the abovementioned features need to be integrated in this component.

The invention also relates to a device for additively manufacturing three-dimensional workpieces, in particular a 3D metal printer, comprising a print head according to the invention.

The invention moreover relates to a method for operating a device for additively manufacturing three-dimensional workpieces with a print head according to the invention.

Further advantages arise, for example, in the fact that the device for delivering the metal advantageously ensures simple delivery of the material, as a result of which material can be redelivered as appropriate and the print head can, for example, be used industrially. In addition, a different suitable material can be delivered, for example after the reservoir has been emptied.

The melting region is advantageously adjacent to an inert atmosphere. It is consequently ensured that the pressure on the melt is virtually constant so that it has no effect on the printing quality. The inert atmosphere moreover ensures that no undesired chemical reaction takes place in the reservoir. The inert atmosphere can, for example, be formed by nitrogen or another inert gas.

The reservoir advantageously has the melting region for melting the metal, wherein it is adjacent to the inert atmosphere and additionally to the compression space. It is consequently possible to separate the melting process in space from the compression or printing process, as a result of which the reproducibility of the drop or a component is improved. The liquid phase of the metal present in the compression space can thus advantageously be induced to pass through the discharge opening by means of the displacement of the piston. The piston thus advantageously bears directly against the melt, as a result of which the accuracy of the printing further increases because the melt is virtually incompressible. The melt or liquid phase of the metal passes from the melting region into the compression space either via gravitational pressure or via a combination of gravitational pressure and the atmospheric pressure of the inert gas. The discharge opening corresponds to a nozzle and can be replaced, depending on the structure of the reservoir.

Further features that improve the invention are explained in detail below together with the description of the preferred exemplary embodiment of the invention with the aid of the drawings.

DETAILED DESCRIPTION

Figure 1:
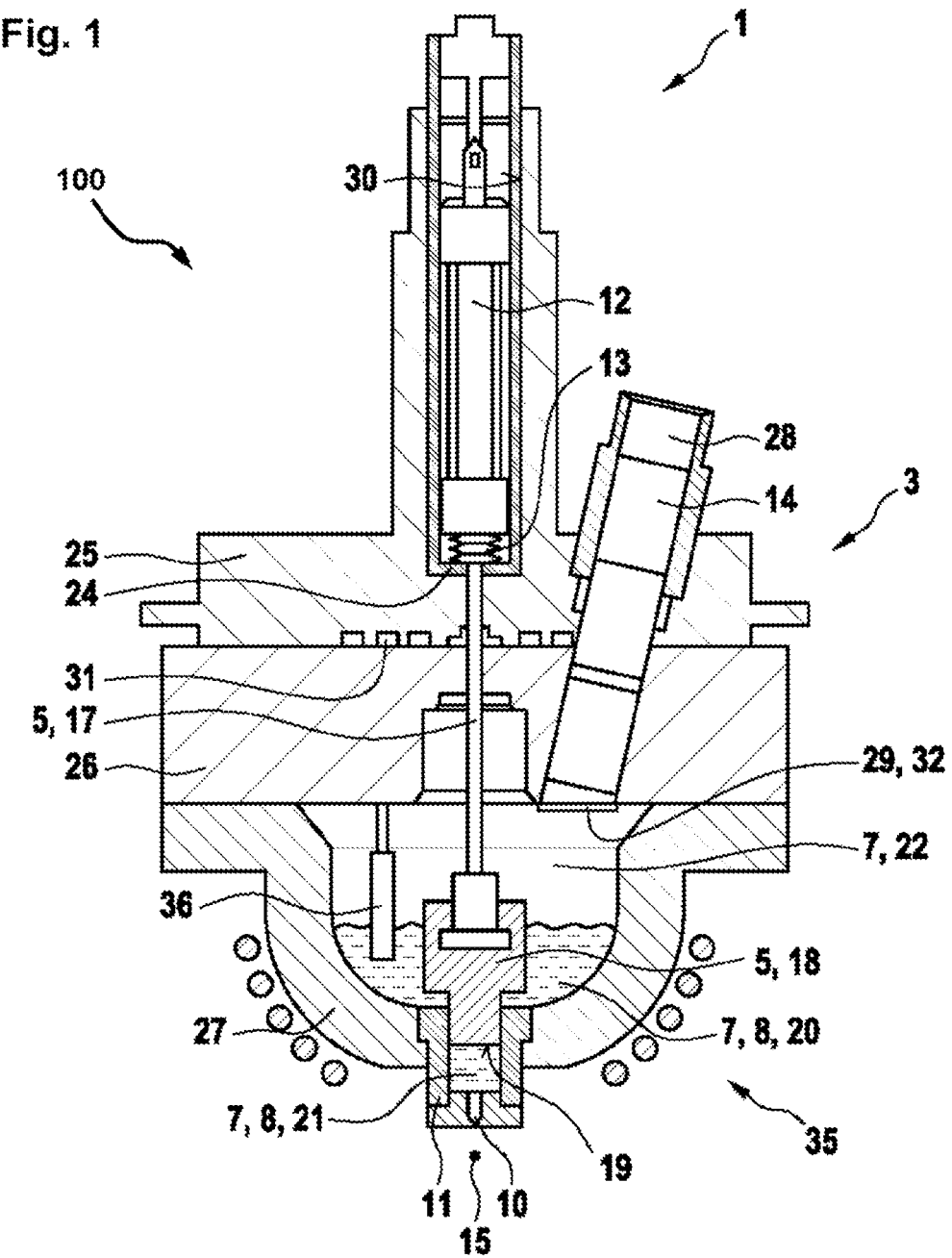
FIG. 1 shows an example of a print head.

FIG. 1 shows a device 100 for additively manufacturing three-dimensional workpieces, in particular a 3D metal printer, and an example of a print head 1 for a 3D printer, in particular a metal printer. The print head 1 comprises a housing 3, a device 28 for delivering a metal 14 in solid phase, a piston 5, a reservoir 7, 27 with a discharge opening 10, and an actuator device 12 for displacing the piston. The reservoir 7, 27 has a melting region 20 and a compression space 21 for a liquid phase 8 of the metal 14, wherein the melting region 20 is adjacent to an inert atmosphere 22 and is connected to the compression space 21 in such a way that the liquid phase 8 of the metal 14 can be induced to pass through the discharge opening 10 by means of the displacement of the piston 5. The liquid phase 8 of the metal 14 is also referred to as the melt 8 and the inert atmosphere 22 is formed by introducing an inert gas 22 into the reservoir 7, 27. The introduction of the inert gas 22 into the reservoir 7, 27 preferably takes place via a cold region of the print head 1.

The housing 3 has a multi-part design, wherein it comprises at least a cooling flange 25, an insulating plate 26, and the reservoir 7, 27.

The piston 5 has a multi-part design, wherein it comprises at least a piston rod 17 made from a metal material and a ceramic plunger 18. Starting from the actuator device 12, the piston rod 17 projects through the cooling flange 25 and the insulating plate 26 into the reservoir 7, 27, where it merges into the plunger 18.

The cooling flange 25 has a recess 30 for accommodating the actuator device 12 which takes the form of a piezoelectric actuator 12. The piezoelectric actuator 12 is fixed in the recess 30 during operation in such a way that, when voltage is applied, it exerts a working stroke on the piston 5, specifically on the piston rod 17 of the piston. The piston rod 17 transmits the working stroke to the plunger 18 such that the latter induces the liquid phase 8 of the metal 14 to pass through the discharge opening 10. The piston 5 can be returned to a starting position without actuating the actuator 12 by a spring 13, wherein the spring 13 is arranged in the recess 30 of the cooling flange 25 between a shoulder 24 and the actuator 12. The spring takes the form of a disk spring. The cooling flange 25 moreover has cooling ducts 31 for cooling purposes. The cooling ducts 31 are arranged between the cooling flange 25 and the insulating plate 26 and a cooling medium is flushed through them. This serves to create a cooling effect with respect to the heating due to the melt 8 and to cool the actuator 12 during operation. The cooling flange 25 is formed from a metal material. The insulating plate 26 bearing on sides of the cooling ducts 31 is formed from a heat-insulating material and in such a way that it reduces heat transfer from the reservoir 7, 27 to the cooling flange 25.

The device 28 for delivering the metal 14 opens into the reservoir 7, 27 and is arranged in the cooling flange 25 and the insulating plate 26. The device 28 projects through the cooling flange 25 and the insulating plate 26 and the metal 14 or the material 14 to be printed can be delivered from outside by the device 28. Pre-metered pieces of material or pellets can preferably be used. An opening 29 through which the material 14 passes into the reservoir 7, 27 is situated at the transition from the insulating plate 26 to the reservoir 7, 27. The opening 29 can be closed by a device 32 such that it is preferably open only when the material 14 is being delivered, as a result of which the escape of energy or gas from the inert atmosphere 22 is reduced.

The reservoir 7, 27 is designed as a crucible 27, wherein an inductor 35 is arranged outside the crucible 27 and a sensor 36, in particular a temperature sensor, is arranged inside the crucible. Another insulator (not shown) can optionally be situated between the crucible 27 and the inductor 35 or the inductor coil 35.

The metal 14 passes in a solid phase 14 into the melting region 20 of the crucible and is heated by the inductor 35 until it changes to a liquid phase 8. When the melt 8 has reached a desired process temperature, which is determined by the temperature sensor 36, the print head 1 can start operating. The liquid phase 8 or the melt 8 moves, under the gravitational pressure of the melt 8 or owing to a combination of gravitational pressure and the atmospheric pressure of the inert gas 22, past the plunger 18 and into the compression space 21. The plunger 18 of the piston 5 is surrounded at a pressure side 19 in the melt 8 or by melt 8 and at the side connected to the piston rod 17 in the inert atmosphere 22 or by the inert atmosphere 22. The piston rod 17 does not come into contact with the melt 8 as a result of the process. The ceramic of the plunger 18 is advantageously a very good conductor of heat in order to be able to effectively transmit the heat generated by the inductor 35 into the compression space 21.

When the piezoelectric actuator 12 is activated, the pressure side 19 of the plunger 18 exerts a pressure on the melt 8 in the compression space 21 in the direction of the discharge opening 10 and ensures that a drop 15 is emitted through the discharge opening 10 of the reservoir 7, 27 or the compression space 21. The discharge opening 10 is designed to emit drops 15 of the liquid phase 8 of the metal 14, wherein the discharge opening 10 has the form of a nozzle 10 and can be rigidly connected to the crucible 27 or, as shown in the exemplary embodiment, has a replaceable insert 11 which allows different nozzle geometries to be used.

Figure 2:
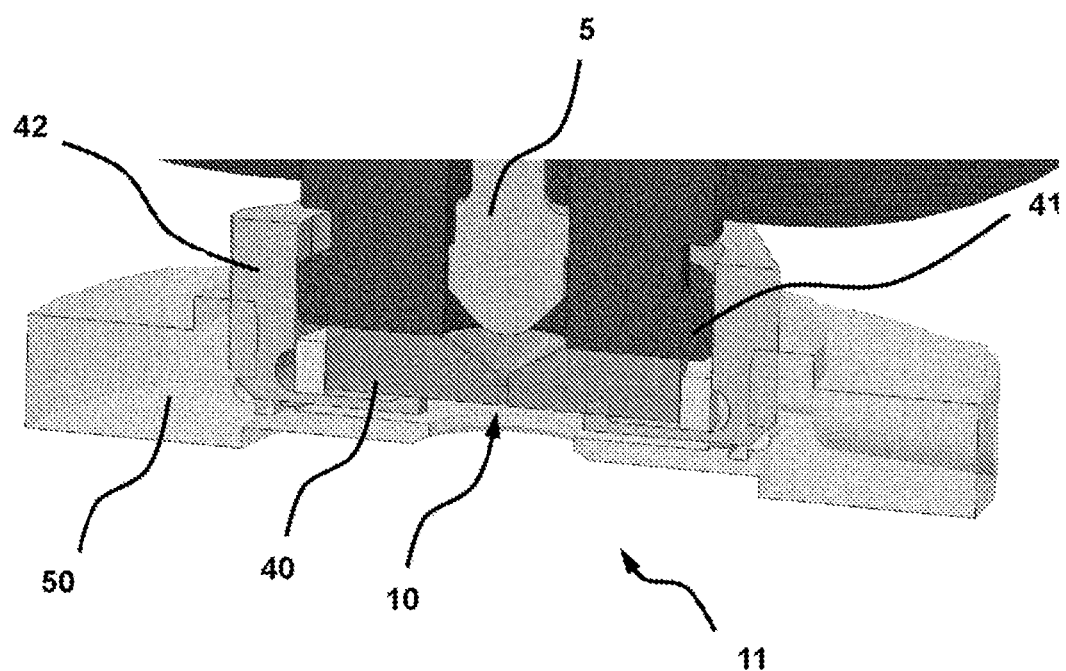
FIG. 2 shows an exemplary embodiment of the print head according to the invention.

FIG. 2 shows part of an exemplary embodiment of the print head 1 according to the invention, wherein the insert 11 has at least a nozzle plate 40 with the discharge opening 10, a guide sleeve 41 for guiding the piston 5, and a nozzle clamping nut 42 for fastening the nozzle plate 40 to the guide sleeve 41, and the device 50 for delivering the protective gas 60 is arranged on the nozzle clamping nut 42.

Figure 3:
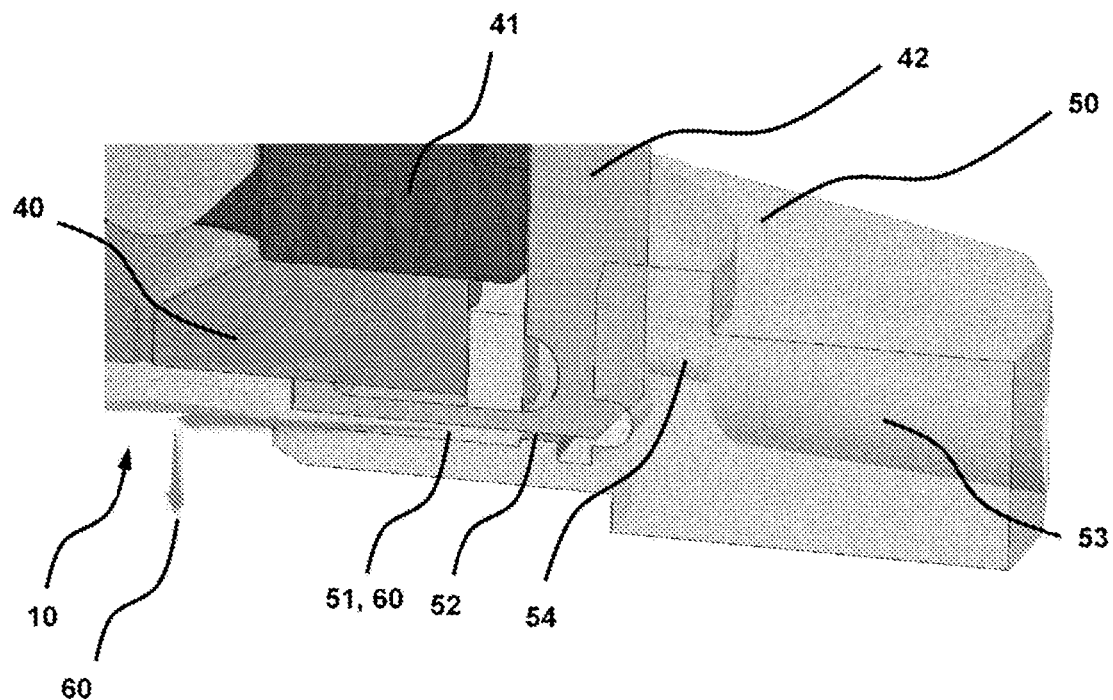
FIG. 3 shows a detailed view of the print head according to the invention.

FIG. 3 shows a detailed view of the print head 1, wherein the device 50 for delivering the protective gas 60 forms, with the nozzle clamping nut 42, a gap 51 for delivering the protective gas 60 to the discharge opening 10. A choke 52 is moreover formed inside the gap 51. The device 50 for delivering a protective gas 60 has a duct 53, 54 for delivering the protective gas 60 to the gap 51.

Figure 4:
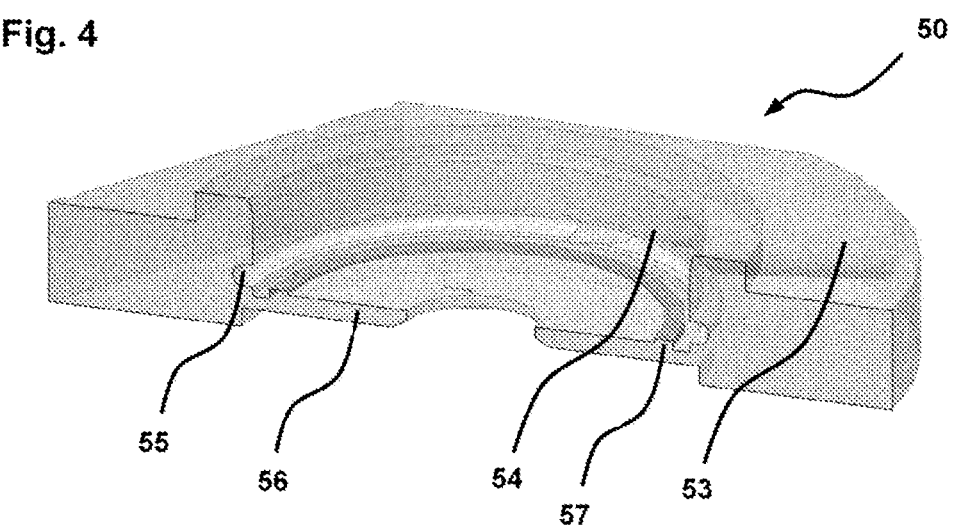
FIG. 4 shows a view of a device for delivering a protective gas.

FIG. 4 shows a view of the device for delivering the protective gas, wherein the duct 53, 54 has a partial duct 54 which opens into an annular groove 55 of the device 50 for delivering the protective gas 60.

The device 50 for delivering a protective gas 60 moreover has a plane surface 56 which, with the nozzle clamping nut 42, forms the gap 51 and a peripheral protrusion 57 which, with the nozzle clamping nut 42, forms the choke 52 is formed on the plane surface 56.

The invention claimed is:

1. A print head (1) for additively manufacturing three-dimensional workpieces, the print head (1) comprising a housing (3), a device (28) for delivering a metal (14), a piston (5), a reservoir (7, 27) with a discharge opening (10) and an actuator device (12) for displacing the piston (5), wherein the reservoir (7, 27) has a melting region (20) and a compression space (21) for a liquid phase (8) of the metal (14), wherein the melting region (20) is adjacent to an inert atmosphere (22) and is connected to the compression space (21) in such a way that the liquid phase (8) of the metal (14) can be induced to pass through the discharge opening (10) by movement of the displacement of the piston (5), wherein the discharge opening (10) is arranged on an insert (11) of the print head (1), characterized in that the print head (1) has a device (50) for delivering a protective gas (60) to the discharge opening (10) of the print head (1), wherein the insert (11) has at least a nozzle plate (40) with the discharge opening (10), a guide sleeve (41) for guiding the piston (5), and a nozzle clamping nut (42) for fastening the nozzle plate (40) to the guide sleeve (41), and the device (50) for delivering the protective gas (60) is arranged on the nozzle clamping nut (42).

2. The print head (1) as claimed in claim 1, characterized in that the device (50) for delivering a protective gas (60) forms, with the nozzle clamping nut (42), a gap (51) for delivering the protective gas (60) to the discharge opening (10).

3. The print head (1) as claimed in claim 2, characterized in that a choke (52) is formed inside the gap (51).

4. The print head (1) as claimed in claim 2, characterized in that the device (50) for delivering a protective gas (60) has a duct (53, 54) for delivering the protective gas (60) to the gap (51).

5. The print head (1) as claimed in claim 4, characterized in that the duct (53, 54) has a partial duct (54) which opens into an annular groove (55) of the device (50) for delivering a protective gas (60).

6. The print head (1) as claimed in claim 3, characterized in that the device (50) for delivering a protective gas (60) has a plane surface (56) which, with the nozzle clamping nut (42), forms the gap (51) and a peripheral protrusion (57) which, with the nozzle clamping nut (42), forms the choke (52) on the plane surface (56).

7. A device (100) for additively manufacturing three-dimensional workpieces, the device (100) comprising a print head (1) as claimed in claim 1.

8. A method for operating the device (100) as claimed in claim 7, the method comprising:
    displacing the piston (5) to induce passage of the liquid phase (8) of the metal (14) through the discharge opening (10).

9. A print head (1) for additively manufacturing three-dimensional workpieces, the print head (1) comprising a housing (3), a device (28) for delivering a metal (14), a piston (5), a reservoir (7, 27) with a discharge opening (10) and an actuator device (12) for displacing the piston (5), wherein the reservoir (7, 27) has a melting region (20) and a compression space (21) for a liquid phase (8) of the metal (14), wherein the melting region (20) is adjacent to an inert atmosphere (22) and is connected to the compression space (21) in such a way that the liquid phase (8) of the metal (14) can be induced to pass through the discharge opening (10) by movement of the displacement of the piston (5), wherein the discharge opening (10) is arranged on an insert (11) of the print head (1), characterized in that the print head (1) has a device (50) for delivering a protective gas (60) to the discharge opening (10) of the print head (1), wherein the device (50) for delivering a protective gas (60) has a plane surface (56) which, with a nozzle clamping nut (42), forms a gap (51) and a peripheral protrusion (57) which, with the nozzle clamping nut (42), forms a choke (52) on the plane surface (56).

\* \* \* \* \*